(12) United States Patent
Beeler et al.

(10) Patent No.: US 9,865,072 B2
(45) Date of Patent: Jan. 9, 2018

(54) REAL-TIME HIGH-QUALITY FACIAL PERFORMANCE CAPTURE

(71) Applicant: Disney Enterprises, Inc., Burbank, CA (US)

(72) Inventors: Thabo Beeler, Zurich (CH); Derek Bradley, Zurich (CH); Chen Cao, Hangzhou Zhejiang Province (CN)

(73) Assignee: Disney Enterprises, Inc., Burbank, CA (US)

( * ) Notice: Subject to any disclaimer, the term of this patent is extended or adjusted under 35 U.S.C. 154(b) by 160 days.

(21) Appl. No.: 14/871,313

(22) Filed: Sep. 30, 2015

(65) Prior Publication Data

US 2017/0024921 A1 Jan. 26, 2017

Related U.S. Application Data

(60) Provisional application No. 62/196,065, filed on Jul. 23, 2015.

(51) Int. Cl.
| | |
|---|---|
| *G06T 13/00* | (2011.01) |
| *G06T 13/40* | (2011.01) |
| *G06T 15/04* | (2011.01) |
| *G06K 9/00* | (2006.01) |

(52) U.S. Cl.
CPC .......... *G06T 13/40* (2013.01); *G06K 9/00221* (2013.01); *G06T 15/04* (2013.01); *G06T 2215/16* (2013.01)

(58) Field of Classification Search
CPC ..................... G06T 13/40; G06T 15/04; G06T 2207/30201
See application file for complete search history.

(56) References Cited

U.S. PATENT DOCUMENTS

| | | | |
|---|---|---|---|
| 9,111,134 B1* | 8/2015 | Rogers | ............... G06K 9/00302 |
| 2009/0195545 A1* | 8/2009 | Debevec | ................. G06T 13/40 |
| | | | 345/473 |

(Continued)

OTHER PUBLICATIONS

Ma et al., Facial Performance Synthesis Using Deformation-Driven Polynomial Displacement Maps, ACM Transactions on Graphics—Proceedings of ACM SIGGRAPH Asia 2008, vol. 27, Issue 5, Article No. 121, Dec. 2008.*

(Continued)

*Primary Examiner* — Charles Tseng
(74) *Attorney, Agent, or Firm* — Kilpatrick Townsend & Stockton LLP

(57) ABSTRACT

A method of transferring a facial expression from a subject to a computer-generated character and a system and non-transitory computer-readable medium for the same. The method can include receiving an input image depicting a face of a subject; matching a first facial model to the input image; generating a displacement map representing of finer-scale details not present in the first facial model using a regression function that estimates the shape of the finer-scale details. The displacement map can be combined with the first facial model to create a second facial model that includes the finer-scale details, and the second facial model can be rendered, if desired, to create a computer-generated image of the face of the subject that includes the finer-scale details.

18 Claims, 10 Drawing Sheets

(56) References Cited

U.S. PATENT DOCUMENTS

2015/0035825 A1    2/2015   Zhou et al.
2015/0084950 A1    3/2015   Li et al.

OTHER PUBLICATIONS

Huang et al., Bilinear Kernel Reduced Rank Regression for Facial Expression Synthesis, EECV 2010, Lecture Notes in Computer Science, vol. 6312, 2010, pp. 364-377.*

Li et al., Lightweight Wrinkle Synthesis for 3D Facial Modeling and Animation, Computer-Aided Design, vol. 58, Jan. 2015, pp. 117-122.*

Sumner et al., "Deformation Transfer of Triangle Meshes," 2004, pp. 399-405, ACM Trans. Graphics 23, 3.

Cao et al., "Displaced Dynamic Expression Regression for Real-time Facial Tracking and Animation," , 2014, 43:1-43.10, ACM Trans. Graphics (Proc. SIGGRAPH) 33, 4.

Beeler et al., "High-Quality Passive Facial Performance Capture using Anchor Frames," 2011, pp. 75:1-75.10, ACM Trans. Graphics (Proc. SIGGRAPH) 30.

Beeler et al., "Improved Reconstruction of Deforming Surfaces by Cancelling Ambient Occlusion," 2012, pp. 30-43, In ECCV.

Cao et al., "Face Alignment by explicit shape regression," 2012, pp. 2887-2894, IEEE CVPR.

* cited by examiner

REAL-TIME HIGH-QUALITY FACIAL PERFORMANCE CAPTURE

CROSS-REFERENCE TO RELATED APPLICATIONS

The present application claims the benefit of commonly assigned U.S. Provisional Patent Application No. 62/196,065, filed on Jul. 23, 2015, the disclosure of which is hereby incorporated by reference in its entirety.

FIELD

The present disclosure relates generally to performance capture, and more specifically to methods, techniques and systems for transferring facial expressions from a subject to a computer-generated animation of the subject.

BACKGROUND

Facial expression transfer is the act of adapting the facial expressions of a subject, such as an actor or home computer user, to a computer-generated (CG) target character. Mastering facial expression transfer and other aspects of facial animation is a long-standing challenge in computer graphics. The face can describe the emotions of a character, convey their state of mind, and hint at their future actions. Audiences are particularly trained to look at faces and identify these subtle characteristics. Accurately capturing the shape and motion of real human faces in the expression transfer process plays an important role in transferring subtle facial expressions of the subject to the CG character giving the CG character natural, life-like expressions.

Facial motion capture, a fundamental aspect of the facial expression transfer process, has come a long way from the original marker-based tracking approaches. Modern performance capture techniques can deliver extremely high-resolution facial geometry with very high fidelity motion information. In recent years the growing trend has been to capture faces in real-time, opening up new applications in immersive computer games, social media and real-time preview for visual effects. These methods approximate the three-dimensional (3D) shape and motion of a face during the performance using either depth or web cameras. To make this tractable, many real-time approaches use generic, coarse-resolution face models (e.g., numerical meshes) as a basis for the reconstruction.

While coarse-resolution models simplify the capture problem and facilitate transferring facial expressions to the animated character, they may not capture the unique finer-scale facial details of the individual performer, such as wrinkles on the forehead or the so-called crow's feet around the eyes. As a result, real-time performance may come at the cost of facial fidelity and there exists a gap in reconstruction quality between current offline and online capture methods.

Embodiments of the disclosure address these and other challenges.

SUMMARY

Some embodiments of the disclosure pertain to high-fidelity facial capture techniques that are able to capture finer-scale details of a subject and reconstruct the finer-scale details in a CG animated character in a manner suitable for real-time facial performance capture. Embodiments can be used to enhance existing coarse-resolution facial models, such as numerical mesh models based on blendshapes, in real-time to achieve higher resolution facial fidelity. By offering more realistic facial capture in real-time, embodiments disclosed herein allow advances in various application domains including, but not limited to, online preview for high-quality offline capture methods, more immersive gaming and social experiences, and the potential for more realistic online facial retargeting to virtual characters. Furthermore, techniques according to the present disclosure are robust and flexible and can used without highly controlled lighting and hardware set-ups required by some techniques. For example, some embodiments can be used with a single motion capture camera instead of multiple cameras that are required by some facial motion capture techniques.

In some embodiments, an existing coarse-resolution real-time tracker, which provides a coarse-resolution face mesh, is enhanced by adding a local regression method that adds in finer-scale details, such as expression wrinkles. Although wrinkles appear at different locations on the face and with different orientations and scales, their visual appearance can be a direct consequence of the shading caused by their local shape. Embodiments of the disclosure can learn the relationship between local image appearance and local wrinkle formation and use such information to reconstruct plausible face wrinkles in real-time from a single RGB camera. In some embodiments, other finer-scale features, such as freckles or moles, can be reconstructed and added to coarse-resolution face mesh in addition to or instead of wrinkles.

In some embodiments a method of transferring captured information from a subject to a computer-generated version of the subject is provided. The method can include receiving an input image depicting the subject; matching a first model comprising a plurality of first features to the input image, the first model being a statistical global model created from a plurality of samples each of which includes the plurality of first features; and generating a displacement map representing second features not present in the first model using a regression function that estimates the shape of the second features. The second features can be features present in one or more of the samples but not all the samples or can be features in such that variation between the features between the plurality of samples is too complex to be subsumed by the first model. The displacement map and first model can then be combined to create a second model that includes the plurality of first features and the second features. In some instances, the subject can be a person, the first model can be a facial model of a person, the plurality of first features can include a nose, two eyes and a mouth, and the second features can include wrinkles.

In some embodiments a method of transferring a facial expression from a subject to a computer-generated character is provided. The method can include: receiving an input image depicting a face of a subject; matching a first facial model to the input image; and generating a displacement map representing the finer-scale details not present in the first facial model using a regression function that estimates the shape of the finer-scale details. The method can further include combining the displacement map with the first facial model to create a second facial model that includes the finer-scale details, and in some instances, the finer-scale details can include one or more wrinkles.

Prior to generating the displacement map, the regression function can be trained in some instances from data representing a plurality of expressions from a plurality of different subjects. As an example, in some embodiments the regression function can be trained by, for each expression in the plurality of expressions, generating an image texture of the expression and an expression displacement map that encodes wrinkle information for the expression; extracting a plurality of wrinkle patches at a plurality of different locations, each wrinkle patch including an image texture patch and a corresponding displacement patch; and training the regression function to predict displacement patches from the image texture patches. In some instances the plurality of locations are determined from a wrinkle map that encodes the per-pixel likelihood of a wrinkle forming at locations in the map, and the wrinkle map can be created from wrinkle information from a plurality of expressions for the subject.

In some embodiments, a method of transferring a facial expression from a subject to a computer-generated character is provided. The method can include receiving a sequence of input images of a facial performance of the subject captured with a camera, the sequence of images including a plurality of sequential frames each depicting the facial performance at a different time. The method can also include, on a frame-by-frame basis, matching the first facial model to a frame in the sequence of input images; generating a displacement map for the frame that represents finer-scale details not present in the first facial model at the frame; and combining the displacement map for the frame with the first facial model matched to the frame to create a second facial model that includes the finer-scale details. If desired, the second facial model can then be rendered to create a computer-generated animation of the subject that includes the finer-scale details and mimics the facial performance.

In various embodiments, the methods provided herein can be implemented in real-time with capturing a sequence of input images of a facial performance.

Also, in some embodiments a system for performing the methods disclosed herein is provided as is a computer-readable memory containing instructions that, when executed by one or more processors, can cause the processors to perform the methods disclosed herein.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

Figure 1:
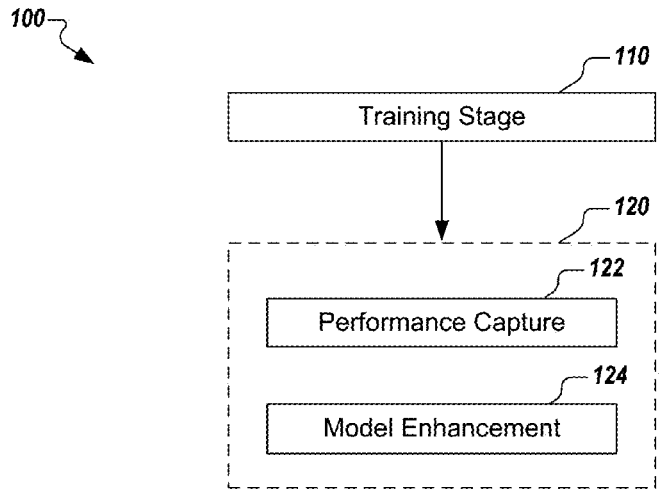
FIG. 1 is a flowchart illustrating a method according to some embodiments of the present disclosure.

The present invention will now be described in detail with reference to certain embodiments thereof as illustrated in the above-referenced drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

DETAILED DESCRIPTION

Applications in immersive computer games, social media and other areas can benefit from rendering realistic and believable animations of computer-generated or digital characters in real-time that capture the detailed, nuanced features of the subject that is the basis for the computer-generated or digital character. These characters may include humans, fictional characters or creatures, or other characters. The face of the subject includes numerous subtleties as the subject performs different poses and/or converses or otherwise changes expressions. Viewers of content may rely heavily on such subtleties when interpreting dialogue, emotions or other aspects of a character. Therefore, transferring a detailed and accurate representation of the subject's facial features, including finer-scale details, such as wrinkles on the subject's face, can be important in creating a realistic animation of the subject.

One or more embodiments described herein include techniques for accurately capturing finer-scale details of a subject and reconstructing the finer-scale details in a CG version of the subject. For example, some embodiments pertain to techniques for capturing wrinkles on the face of a subject during a performance and reconstructing the wrinkles on a CG character created from the subject. While embodiments of the disclosure are particularly well suited to transfer such finer-scale details during a real-time motion capture session, the disclosure is not limited in this manner and can be used for offline applications as well, such as transferring expressions to a CG character for a motion picture or other multimedia application to produce believable, robust, and editable animations in an automated manner. In some examples, one or more techniques may be provided for adding finer-scale details of a subject to a CG character generated from the subject in real-time. For example, images of facial expressions of the subject may be captured by one or more cameras, optical scanners, or other image capture devices. Input data (e.g., position information defining positions on the subject, contour information defining contour features of the subject, or other suitable input data) corresponding to one or more poses performed by the subject may be computed from the images, and may be processed to generate a coarse-resolution facial model that mathematically defines the shape and motion of the underlying asset, such as a computer-generated representation of the subject's face. In some embodiments, the coarse-resolution facial model can be a statistical model, such as an adjustable three-dimensional numerical mesh.

Embodiments of the disclosure can enhance a coarse-resolution facial model, such as a coarse-resolution real-time facial tracker that provides a coarse-resolution face mesh, by adding finer-scale details, such as expression wrinkles, in real-time.

As used herein, a "coarse-resolution" facial model is a model that includes coarse-scale features common among the sample subjects used to create the generic model. For example, if the generic model is representative of a human face, the samples of human faces used to create the generic model will each include one nose, two eyes and a mouth. Thus, the coarse-resolution facial model will include a nose, two eyes and a mouth. "Finer-scale" details are either features that are not common among the samples or features where the variation is too complex to be subsumed within the generic model. Once generated, the coarse-resolution facial model can be used to track the subject during a performance and produce realistic representations of the captured facial expressions of the subject. The coarse-resolution facial model can track these generic or "coarse-resolution" features but cannot accurately capture finer-scale details, such as wrinkles, that can vary greatly from person-to-person. For example, one person may have two wrinkles on her forehead while another has three wrinkles in a different position.

FIG. 1 is a high-level flowchart illustrating a method 100 according to some embodiments of the present disclosure. As shown in FIG. 1, method 100 includes two stages: a training stage 110 and a performance capture and enhancement stage 120. In training stage 110, a training engine is trained with data acquired by a performance capture system to generate an enhancement function that can be used by an enhancement engine in stage 120. A variety of different capture systems can be used for training stage 110 and in some embodiments, the capture system can include just a single camera enabling embodiments of the disclosure to be used in situations where other motion capture techniques are not feasible.

The data used in training stage 110 to generate the enhancement data can include high-resolution sample images from multiple different subjects along with high-resolution meshes of the subjects. In some embodiments, training stage 110 uses input data from a relatively small set of performers (e.g., less than 10 performers) performing extreme expressions (e.g., smiling, frowning, sighing, yelling, etc.), but the disclosure is not limited to receiving input data from any particular number of performers or any particular expressions. During training stage 110, multiple small patches of the images are identified that include the finer-scale details (e.g., wrinkles) that are to be added to an enhanced model during stage 120. From these patches, the training engine is taught to predict the shape of the finer-scale details (e.g., wrinkles) given the captured appearance in an image as described below with respect to FIGS. 3-8. Training stage 110 can create an enhancement function that the enhancement engine can use to apply the finer-scale details to a coarse-resolution facial model in performance capture and enhancement stage 120. Training stage 110 need only occur once, after which the enhancement data from the training stage can be applied to enhance coarse-resolution facial models of any number of different users.

Performance capture and enhancement stage 120 includes a performance capture sub-step 122 in which an initial coarse-resolution animation of the performance is generated and an enhancement sub-step 124 in which the initial animation is enhanced with the enhancement data generated in stage 110 representing finer-scale details missing from the coarse-resolution model. In some embodiments, the enhancement sub-step 122 in stage 120 can occur essentially simultaneous with the performance capture sub-step 124. That is, enhancement can happen in real-time while the facial expressions of a subject are being captured. The disclosure is not limited to real-time use, however, and in some embodiments enhancement sub-step 124 can occur long after the subject's performance is captured (sub-step 122), i.e., in an offline process. As an example, some embodiments of the disclosure can be used to enhance coarse-resolution facial models from a prior performance capture session that is stored in a computer-readable memory.

During stage 120, an enhancement engine fits a coarse-resolution face mesh to an input image (e.g., a frame in a sequence of frames in which a subject's facial expressions were captured during a performance that is to be transferred to a CG animation of the subject). A variety of readily available facial tracking systems can be used to fit the input image to the coarse-resolution mesh. Several such systems use blendshapes but embodiments of the disclosure are not limited to any particular facial tracking technique and can use other types of global priors.

Once the coarse-resolution mesh has been fit to the input image, the enhancement engine can reference the enhancement function to add finer-scale details to the coarse-resolution mesh and produce a high-fidelity mesh that includes both the coarse-scale features and the finer-scale details that are specific to the subject in the input image. To do so, in some embodiments the enhancement engine computes a texture map from the coarse-resolution mesh, predicts a displacement map from the texture map that represents the finer-scale details and then applies the displacement map to the coarse-resolution mesh to produce a final, high-fidelity mesh as described below in conjunction with FIGS. 9-12. While stage 120 can be used to enhance a single input image, in most embodiments the input image will be a series of input images that represent a subject's facial expression that changes over time in which case portions of stage 120 can be applied to each frame in the series on a frame-by-frame basis to produce a CG animation that matches the changing facial expression.

Figure 2:
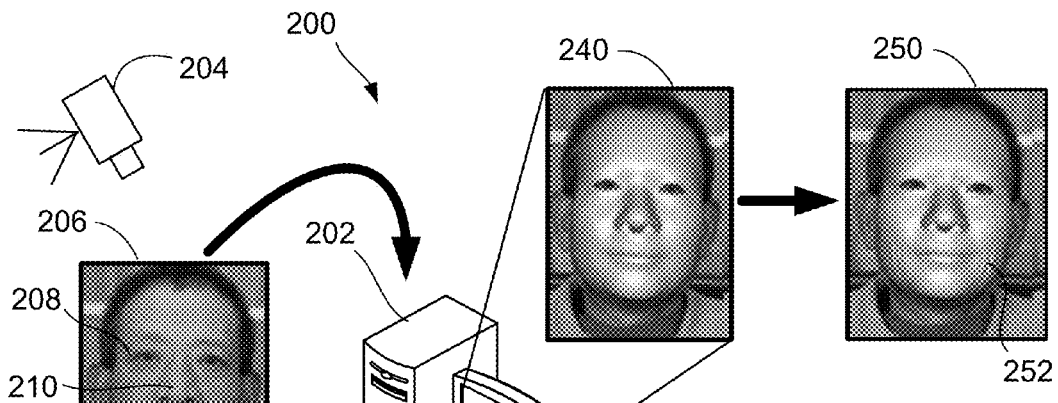
FIG. 2 is a block diagram of an animation system according to embodiments of the disclosure that can implement the method shown in FIG. 1.
Figure 2:
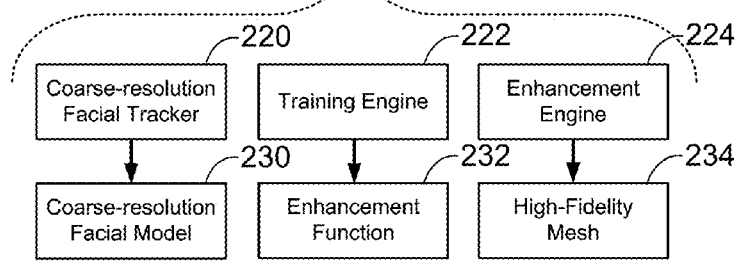

FIG. 2 is a block diagram of an animation system 200 with which the facial performance of a subject can be captured and transferred to a CG character according to embodiments of the disclosure. Animation system 200 includes a computer system 202 in communication with one or more image capture devices 204, such as a monocular camera, that may capture images of a subject's face 206 during an image capture process. Subject's face 206 includes coarse-scale features, such as eyes 208, nose 210 and mouth 212 as well as finer-scale details, such as wrinkles 214.

Animation system 200 also includes a coarse-resolution facial tracker 220 along with a training engine 222 and an enhancement engine 224, each of which can be stored within and executed by computer system 202. Coarse-resolution facial tracker 220 can be used to transfer facial expressions of subject 206 captured by image capture device 204 to a CG character. For example, coarse-resolution facial tracker 220 can generate a coarse-resolution facial model 230 from an image of the face of subject 206 taken by camera 204. Coarse-resolution model 230 can be rendered and displayed on a display associated with computer system 202 as image 240. As shown in FIG. 2, image 240 can match the general expression or pose of subject 206 in the eye, nose and mouth areas, but may not accurately represent wrinkles or other finer-scale details that may be present in a given facial expression of subject 206.

Enhancement engine 224 can add such finer-scale details as discussed in block 120 above by referencing an enhancement function 232 generated by training engine 222 as discussed with respect to block 110. The enhancement engine can combine coarse resolution facial mesh 230 with finer-scale details missing from mesh 230 and generated by enhancement function 232 to produce a high-fidelity mesh 234 that can be rendered by and displayed on computer system 202 as an image 250. As shown in FIG. 2, image 250 can match the general expression or pose of subject 206 in the eye, nose and mouth areas, and unlike image 240, can also accurately represent wrinkles 252 or other finer-scale details that may be present in a given facial expression of subject 206.

Figure 3:
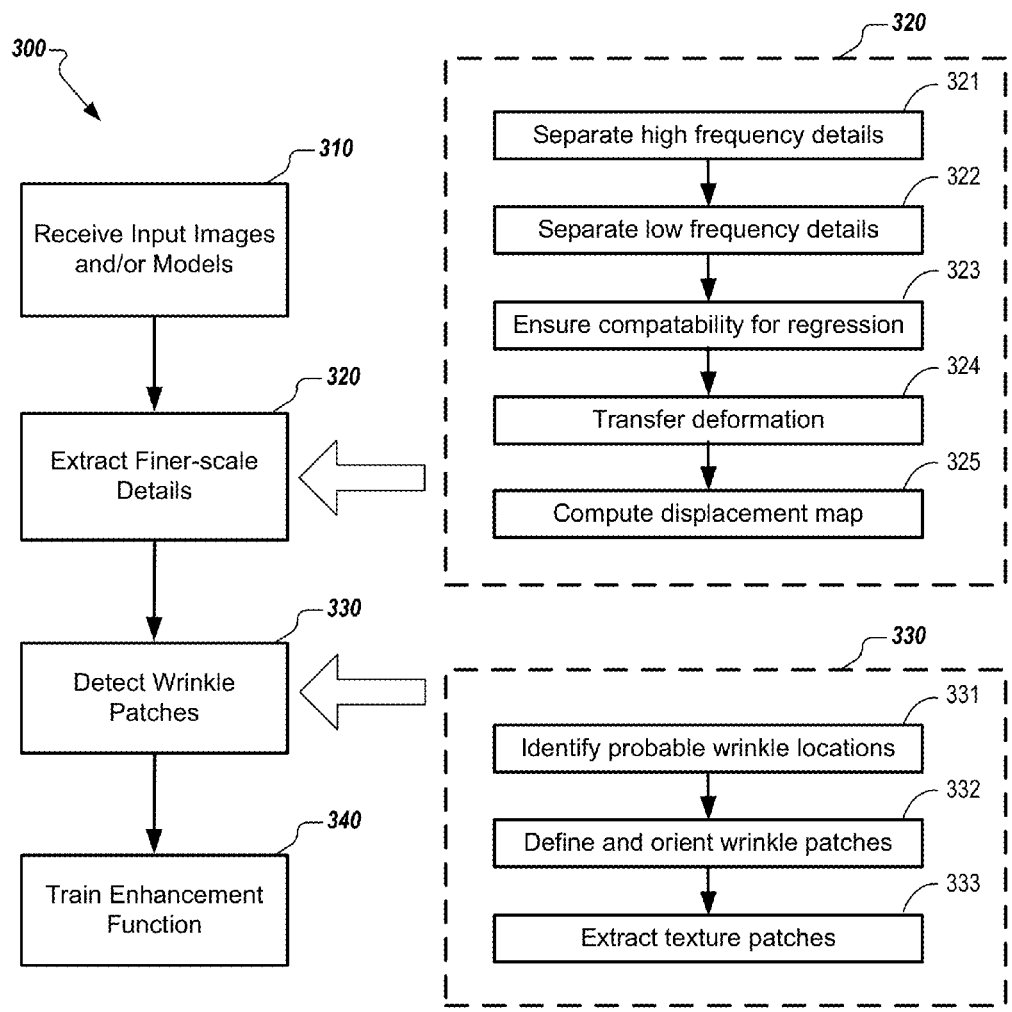
FIG. 3 is a flowchart illustrating a method of implementing training stage 110 shown in FIG. 1 according to some embodiments of the present disclosure.
Figure 4:
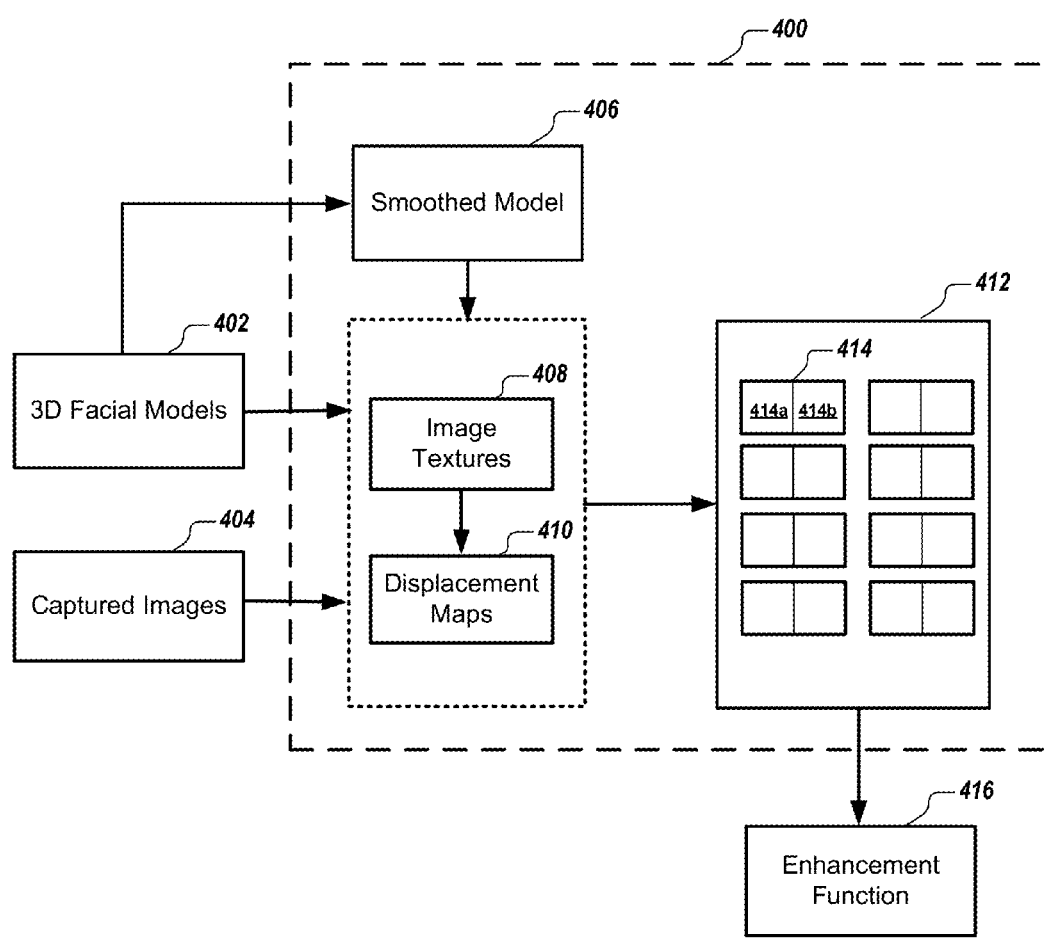
FIG. 4 is a simplified block diagram of a training engine 400 that can execute the method illustrated in FIG. 3 according to some embodiments of the disclosure.

Reference is now made to FIG. 3, which is a flowchart illustrating a method 300 of implementing training stage 110 according to some embodiments of the disclosure, and FIG. 4, which is a block diagram of a training engine 400 that can execute method 300 according to some embodiments of the disclosure. In some embodiments, training engine 400 can reside on computer system 202 and can be representative of training engine 222.

Training engine 400 can receive as input a set of high-quality three-dimensional (3D) facial models 402 (3D numerical meshes) that include various extreme expressions demonstrating wrinkles, from one or more different subjects, as well as captured images 404 representing the same extreme expressions (FIG. 3, block 310). In some embodiments, for each subject (e.g., actor) represented in the set of models 402 and images 404, the subset of models and images for that subject has the same topology and at least one of the models and images is of an expression in which the skin of the subject is relaxed and thus generally without wrinkles, such as a neutral expression. In some embodiments, the skin of the subject does not need to be relaxed globally. Instead, the skin can be relaxed locally in different regions of different images. For example, two images, an image A in which the subject's left eyebrow is raised and the right portion of the forehead relaxed and an image B in which the subject's right eyebrow is raised with the left portion of the forehead relaxed, can be combined since between images A and B both the left and right portions of the subject's forehead is relaxed. Models 402 and images 404 can be generated with existing facial capture systems as is known to those of skill in the art. In some particular embodiments, models 402 are high-resolution meshes that include more detail than coarse-resolution facial model 220 and can be generated as described in Beeler et al. "High-Quality Passive Facial Performance Capture Using Anchor Frames", ACM Trans. Graphics (Proc. SIGGRAPH) [2011], which is hereby incorporated by reference in its entirety. In other embodiments, other techniques of acquiring and generating the input models and images can be used.

Next, image textures 408 are generated and finer-scale details from the high-resolution models are extracted as displacement maps 410 (FIG. 3, block 320). The extraction process, which can include sub-blocks 321-325 as described below, encodes only details that would not already be present in the coarse-resolution online tracker. As an example, consider a training dataset that consists of a total of 18 meshes captured from four different subjects. In order to describe the detail extraction, consider the subset $\{M^j\}$, which consists of the meshes of a single subject, and assume $M^0$ is the neutral expression. All other subjects can be processed analogously.

When tuned to wrinkles, the finer-scale detail extraction process is concerned with medium-frequency details. Towards this end, training engine 400 smoothes the high quality meshes 402 to obtain smoothed meshes 406 for each high-resolution training expression $M^j$. In some embodiments, extraction of the medium-frequency details can be done by separating both the low frequency and high frequency bands from the training data. Removing the high-frequency features (e.g. pores) is relatively straightforward (FIG. 3, block 321). In some embodiments, high-frequency features can be removed by smoothing the meshes with a narrow Gaussian filter $$\{M^j\} \leftarrow \{G^{HF}(M^j)\}.$$

Next, low-frequency details are removed (FIG. 3, block 322). This process can be more involved as the low-frequency details depend on the coarse tracking mesh L. Towards this end, training engine 400 can define a lowpass filter G which can serve as a bandpass to separate low and medium frequencies. With this filter, training engine 400 can extract the medium-expression frequencies from the training mesh. Before doing so, however, in some embodiments, training engine 400 ensures that the coarse-resolution mesh is compatible (FIG. 3, block 323).

The coarse-resolution tracking mesh may also contain medium-frequency expression details that need to be removed to avoid interference during detail regression. In other words, details that will be explained by the local regression are removed from the global model to prevent the details from being explained twice. The coarse-resolution mesh is referenced for this process since it is a global model that includes context to discriminate features that need to be removed from features that will be unique to the local regression. As one example, the nasolabial fold is a medium-frequency expression detail that most humans have in common and thus may be present in the global model. In other areas, such as the forehead, the medium-expression frequencies tend to be missing from the coarse model, since wrinkles can vary considerably from person-to-person. One way to remove these frequencies would be to filter L with the lowpass filter G to produce G(L). This, however, removes not only the frequencies caused by the expression but also attenuates spatial frequencies helpful for the identity, such as parts of the nose. To separate the identity and expression frequencies from each other, some embodiments of the disclosure compute the deformation from $G(L^0)$ to $G(L^b)$ and transfer it to $L^0$ using a deformation transfer in order to create $L_0^b$, which preserves the identity frequency bands while removing the medium-expression frequencies. Training engine 400 can process all basis shapes B of the global tracker in this way thus making it compatible for detail regression. In some embodiments, smoothed meshes 406 can be generated separate from training engine 400 and received by the training engine as input along with models 402 and images 404. In the discussion that follows, L now refers to the compatible coarse mesh.

A goal during performance capture and enhancement stage 120 (FIG. 1) is to add finer-scale details, such as expression wrinkles, to the coarse-resolution result of a facial expression tracker. As described above, a variety of different face trackers can be used with embodiments of the disclosure. In some particular embodiments, a real-time tracker as described in Cao et al., "Displaced Dynamic Expression Regression for Real-time Facial Tracking and Animation", ACM Trans. Graphics (Proc. SIGGRAPH) [2014], which is hereby incorporated by reference in its entirety, can be used as the real-time face tracker. The real-time tracker described in Cao et al. uses an underlying face model with parameters for identity, expression and rigid transformation.

After ensuring the coarse mesh L is compatible, training engine 400 assumes the face model has a low-distortion UV mapping, which is transferred from the aligned neutral mesh $L^0$ to the high-resolution counterpart $M^0$. To extract the expression details, training engine 400 transfers the deformation from the filtered meshes $G(M^0) \rightarrow G(M^j)$ to the unfiltered neutral shape $M^0$ (FIG. 3, block 324). The result is a mesh $M_0^j$, which exhibits the same overall expression as $M^j$ but lacks the medium frequency expression details. These are the relevant details that training engine 400 aims to retrieve and encode as displacement map 410.

Figure 5:
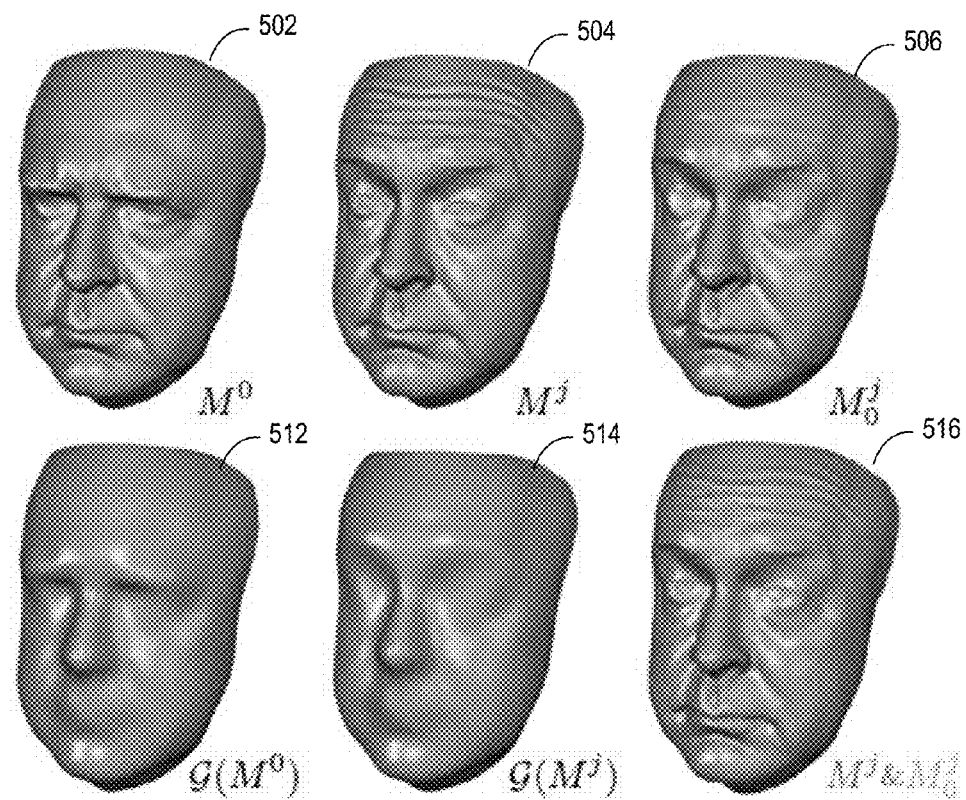
FIG. 5 illustrates a high resolution training mesh tracked to a neutral expression and an extreme expression and further illustrates the extraction of medium-frequency details from the mesh according to some embodiments of the disclosure.

The extraction process of blocks 321-324 is illustrated by example in FIG. 5 where a high resolution mesh for a neutral expression 502 and a high resolution mesh for one extreme expression 504 are shown at the top left and center of the figure. Neutral expression 502 has few or no wrinkles while extreme expression 504 has multiple wrinkles in the forehead area of the subject. Also shown in FIG. 5 is a mesh 506 that represents expression 502 moved into expression 506. Mesh 506 looks similar to expression 504 except that it lacks the detailed wrinkles of expression 504. Thus, wrinkles can be identified by subtracting mesh 506 from mesh 504. Also shown in FIG. 5 are smoothed versions of meshes 502, 504 and 506 that have had the medium-frequency details removed. Specifically, mesh 512 represents a smoothed version of mesh 502; mesh 514 represents a smoothed version of mesh 504; and mesh 516 represents a smoothed version of mesh 506.

Figure 6:
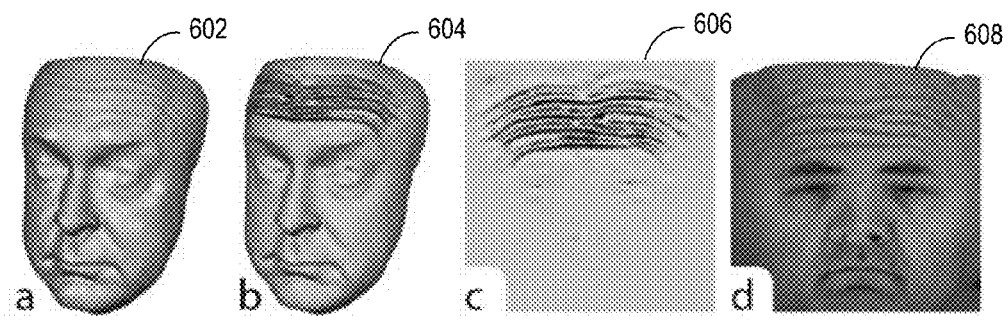
FIG. 6 illustrates an expression and aligned mesh along with images that depict displacement information and a displacement mesh in accordance with some embodiments of the disclosure.

The displacement map $D^j$ can then be computed from $M_0^j$ by tracing rays along the normal (in both directions) for all vertices and computing the signed distance to the intersection with $M^j$ (FIG. 3, block 325). This process is visualized in FIG. 6. As shown in FIG. 6, given the expression $M^j$ and the aligned mesh $M_0^j$ (mesh 602, which is the same as mesh 516 in FIG. 5), training engine 400 can compute the positive (red) and negative (blue) displacements along the normal (image 604). These displacements can be stored as a displacement map $D^j$ (image 606) in the texture uv-layout (image 608).

Figure 7:
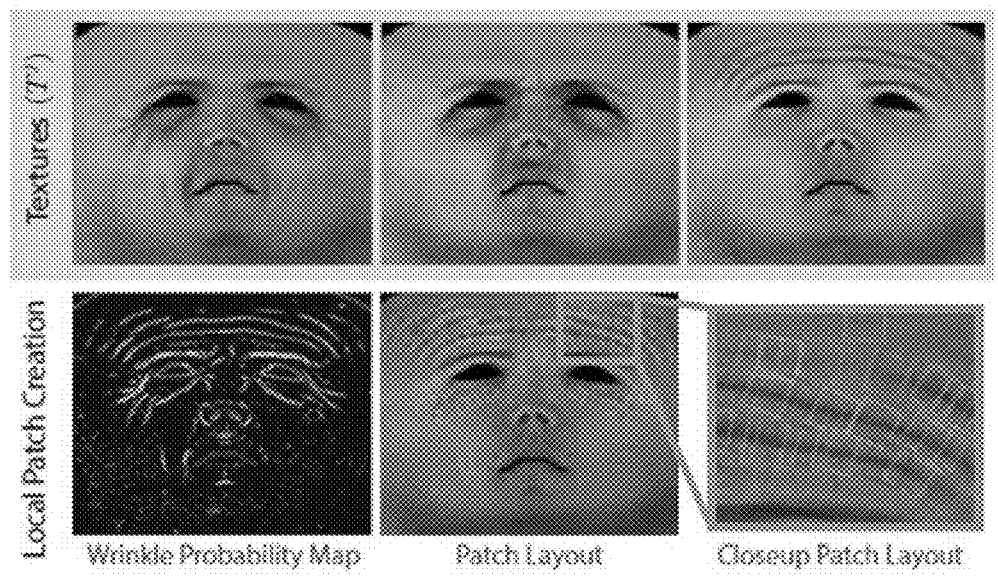
FIG. 7 illustrates the selection of wrinkle patches from a texture image according to some embodiments of the disclosure.

After training engine 400 has generated image textures 408 and displacement maps 410 for each of the training expressions, the training engine can define a local wrinkle model that includes small rectangular patches of both texture and displacement, oriented along wrinkle lines in the UV-space. Training engine 400 can define the wrinkle model by automatically detecting wrinkle patches in the displacement maps (FIG. 3, block 330) as described below in conjunction with FIG. 7. As shown in FIG. 7, from the sample textures $T^j$ (top row), embodiments of the disclosure can automatically determine locations where wrinkling may occur by computing a wrinkle map (FIG. 7: bottom, left; FIG. 3, block 331). Guided by the wrinkle map, patches can then be placed and oriented at these locations to extract texture patches $\{t_i\}$ for training (FIG. 7: bottom center and bottom right; FIG. 3, block 332).

The training expressions contain extreme facial wrinkles, which appear with strong shadows in the texture images. For a given subject, even though wrinkles may be spread over different parts of the face, the spatial location of wrinkle lines remains fixed over time and thus wrinkles will always appear in the same locations in UV-space. Thus, training engine 400 can combine wrinkle information from all poses into a single wrinkle map for each subject (actor), which encodes the per-pixel likelihood of a wrinkle forming at this location.

As before, consider the subset of textures $\{T^j\}$ and displacement maps $\{D^j\}$ that correspond to a single subject, and as before each subject is processed analogously. Training engine 400 can create subject-specific wrinkle maps by identifying features in the individual texture images that potentially correspond to wrinkles for the given subject. To this end, the training engine can apply a Difference of Gaussians (DoG) filter to each texture image, and then set the wrinkle map to the average filter response across textures for each filtered pixel value above a user-defined threshold $\alpha$. A subset of texture images and the combined wrinkle map is shown in FIG. 7 as discussed above. Training engine 400 can similarly define a 2-channel gradient image by averaging the texture gradients of those pixels that contributed to the wrinkle map.

Training engine 400 can now define local wrinkle patches 414 of user-defined size w1×w2 aligned with the wrinkle map. Due to the anatomy of the face, expression wrinkles are most likely to appear on the forehead, around the eyes, and along the crease of the cheek. Thus, in some embodiments, training engine 400 constrains its computations to these areas. Even still, it is not necessary to create densely overlapping wrinkle patches, so training engine 400 can prioritize patch placement by creating a list l of all pixels within the valid regions, sorted in decreasing order by probability of being part of a wrinkle. A set of wrinkle patches 412 can then be created (FIG. 3, block 333) iteratively by choosing the pixel p with highest probability from l, placing a rectangle centered at p, and orienting the rectangle with the gradient at p as illustrated in FIG. 7 (bottom, right). A local wrinkle patch 414 within set 412 is then defined by the pair of vectors (t, d), representing the image texture 414a and displacement pixels 414b within the rectangle, respectively. For each pixel p training engine 400 generates a new patch for every expression j where the filtered texture image at p is larger than $\alpha$. Once the patches for a pixel location are created, the training engine removes all the pixels from l that are covered by the sub-rectangle of size ρw1×ρw2 centered at p, and continues until l is empty. A density parameter ρ allows training engine 400 to control the patch density.

In the particular example illustrated in FIG. 7, the resolution of the image texture and displacement maps is 1024×1024, and the Difference of Gaussians filter has a small kernel of size 6 and large kernel of size 8. The threshold $\alpha$ is fixed to 0.005, the patch size w1 and w2 is 32×32, and the density parameter ρ is set to 0.5.

Next, an enhancement function 416 is trained (FIG. 3, block 340) to learn the mapping from local image appearance to wrinkle displacements. Enhancement function 416 can be, for example, enhancement function 232 shown in FIG. 2. In some embodiments, enhancement function 416 performs a regression. Enhancement function 416 can be taught to learn a function Φ that infers local shape of the finer-scale details from local shading. More formally:

$$\varphi(t_i) = d_i, \quad (1)$$

where $t_i$ is the local image texture and $d_i$ the local displacement map of the i-th patch. To avoid superimposing spatial frequencies, which could lead to undesired artifacts, some embodiments of the disclosure define and compute the detail displacement d.

Figure 8:
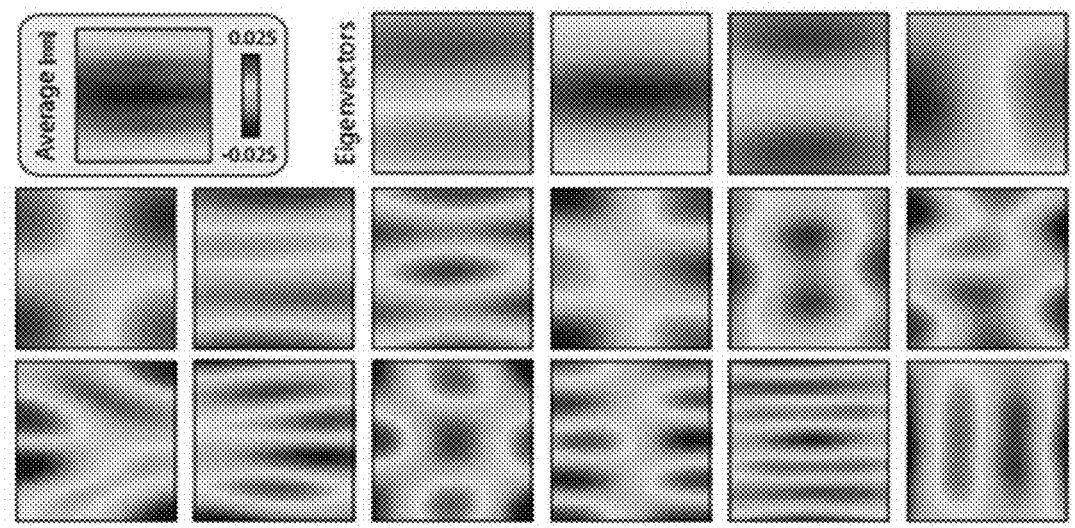
FIG. 8 illustrates a set of 16 eigenvectors of displacement patches from a training set that can encode the predominant variations in wrinkle shape according to some embodiments of the disclosure.

To reduce the complexity and to better constrain the regression, training engine 400 can recognize structure present within the data and chose patches (FIG. 3, block 330) such that they are centered at wrinkles and oriented consistently. Since these patches are therefore all aligned to each other, this can serve to reduce the dimensionality of the regression space substantially using principal component analysis (PCA) on the full set of N displacement patches $\{d_i\}$ from all training data, and extract the M dimensions with the largest variance. In the particular example illustrated herein, M is 16 and these 16 dimensions capture approximately 85% of the energy present in the training data. FIG. 8 shows that these dimensions intuitively capture the predominant variations in wrinkle shape. Projecting the original displacement patches $\{d_i\}$ into this subspace gives training engine 400 the ground truth displacement coefficients $\{\hat{c}_j\}$, which can be used as the regression target. The input to the regression are the N corresponding patches $\{t_i\}$ extracted from the image textures $\{T^j\}$.

From these patches, enhancement function 416 can learn a regression function Φ* that maps $t_i$ to $\hat{c}_i$ by minimizing the energy $$E^{reg} = \sum_{i=1}^{N} \|\Phi^*(t_i) - \hat{c}_i\|^2 \quad (2)$$

Reconstructing the output of Φ* with the PCA subspace basis links Φ* back to Φ defined in Equation 1 above.

Regression function Φ* can be a one-level weak regressor $R^k(t_i)$ that does not depend on a previous result $c_i^{k-1}$, which is only required for regressing the external level. The one level regressor used in some embodiments of the disclosure removes the sequential interdependency of the K weak regressors during runtime and allows them to be evaluated in parallel.

Note that during training, the weak regressor $R^k$ can be trained on the residuals $\{e_i^{k-1}\}$ from the previous stage as sequential interdependencies still exist, which is desired as this preserves the hierarchical character. As weak regressors, enhancement function 416 uses random ferns which are trained on the input samples by minimizing $$R^k = \underset{R}{\operatorname{argmin}} \sum_{i=1}^{N} \|\hat{c}_i - (c_i^{k-1} + R(t_i))\|. \quad (3)$$

As an initial estimate of $c_i^0$, enhancement function 416 can choose the average over the training set $\bar{c} = \operatorname{avg}(\{\hat{c}_i\})$.

The weak regressor R consists of F features and randomly selected thresholds, which divide the training samples into $2^F$ bins. As features, enhancement function 416 can use the intensity differences of two pixels in the image patch $t_i$. Due to the inherent normalization of the regression data, training engine 400 does not need to employ shape indexed features, but instead can randomly sample P pixels in the patches. These P pixels provide $P^2$ pixel pairs, from which the training engine can select F good candidates according to a correlation-based feature selection process, such as the process proposed in Cao et al., "Alignment by explicit shape regression", *IEEE CVPR*, 2887-2894 [2012], which is hereby incorporated by reference in its entirety. The regression output δc for each bin b can be calculated as $$\delta c_b = \frac{\sum_{i \in \Omega_b} (\hat{c}_i - c_i)}{|\Omega_b| + \beta}, \quad (4)$$

where $\Omega_b$ is the subset of training samples falling into bin b and β is a free shrinkage parameter that prevents over fitting when there is insufficient training data in the bin. Subsequently, enhancement function 416 can update the coefficients $c_i$ for samples in $\Omega_b$ as $c_i \leftarrow c_i + \delta c_b$ to prepare for the next regression level. For the results illustrated herein, values of K=1280, F=5, P=50 and β=1000 were chosen.

Figure 9A:
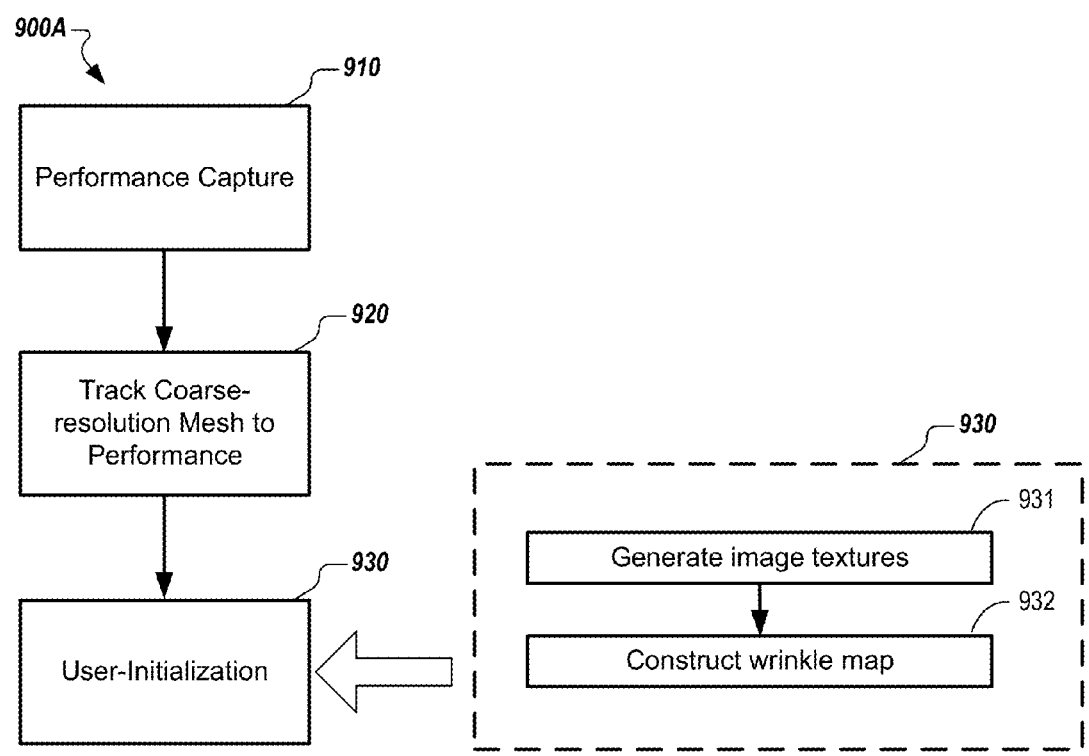
FIGS. 9A and 9B are flowcharts illustrating a method of implementing performance capture and enhancement stage 120 shown in FIG. 1 according to some embodiments of the present disclosure.
Figure 9B:
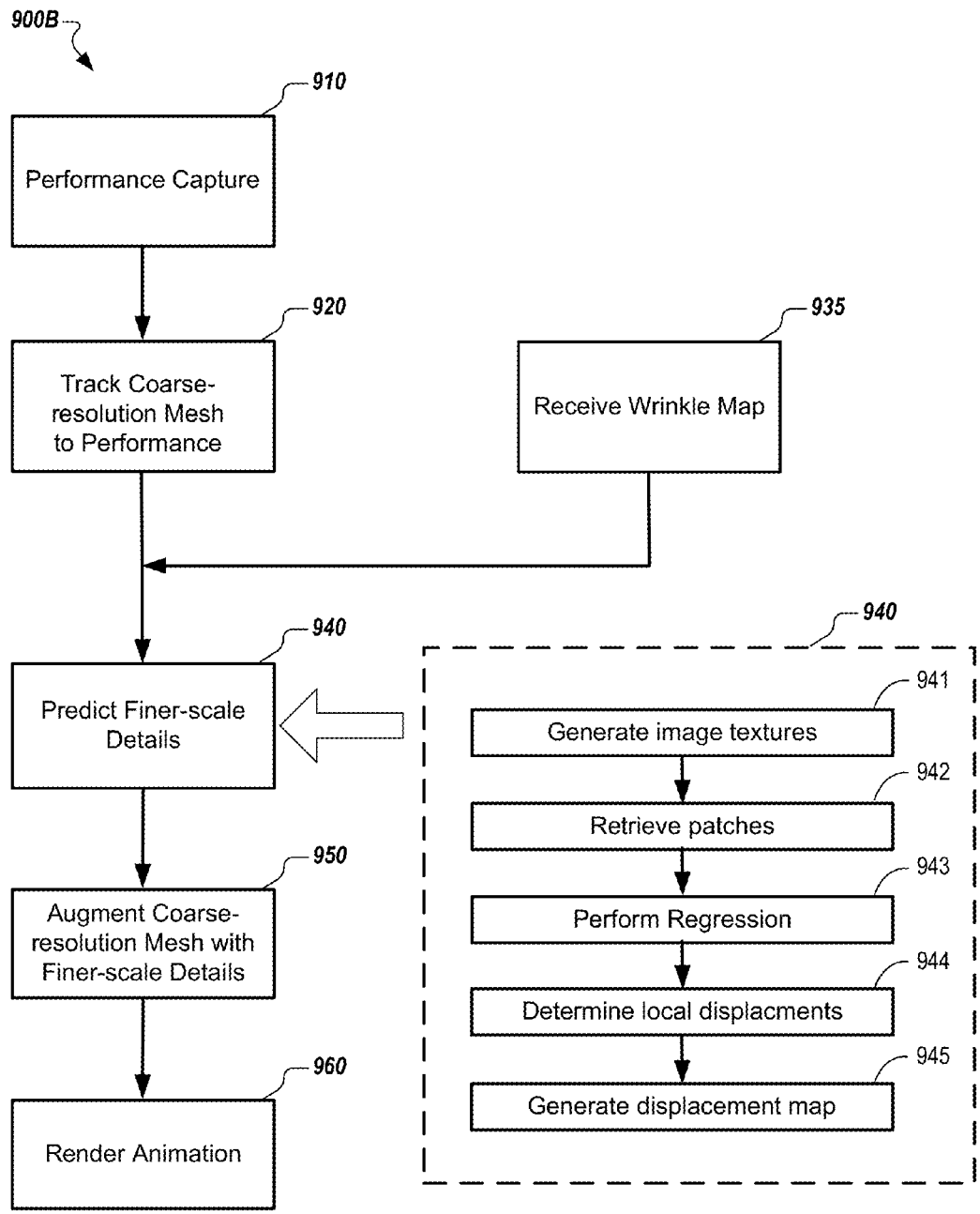
Figure 10:
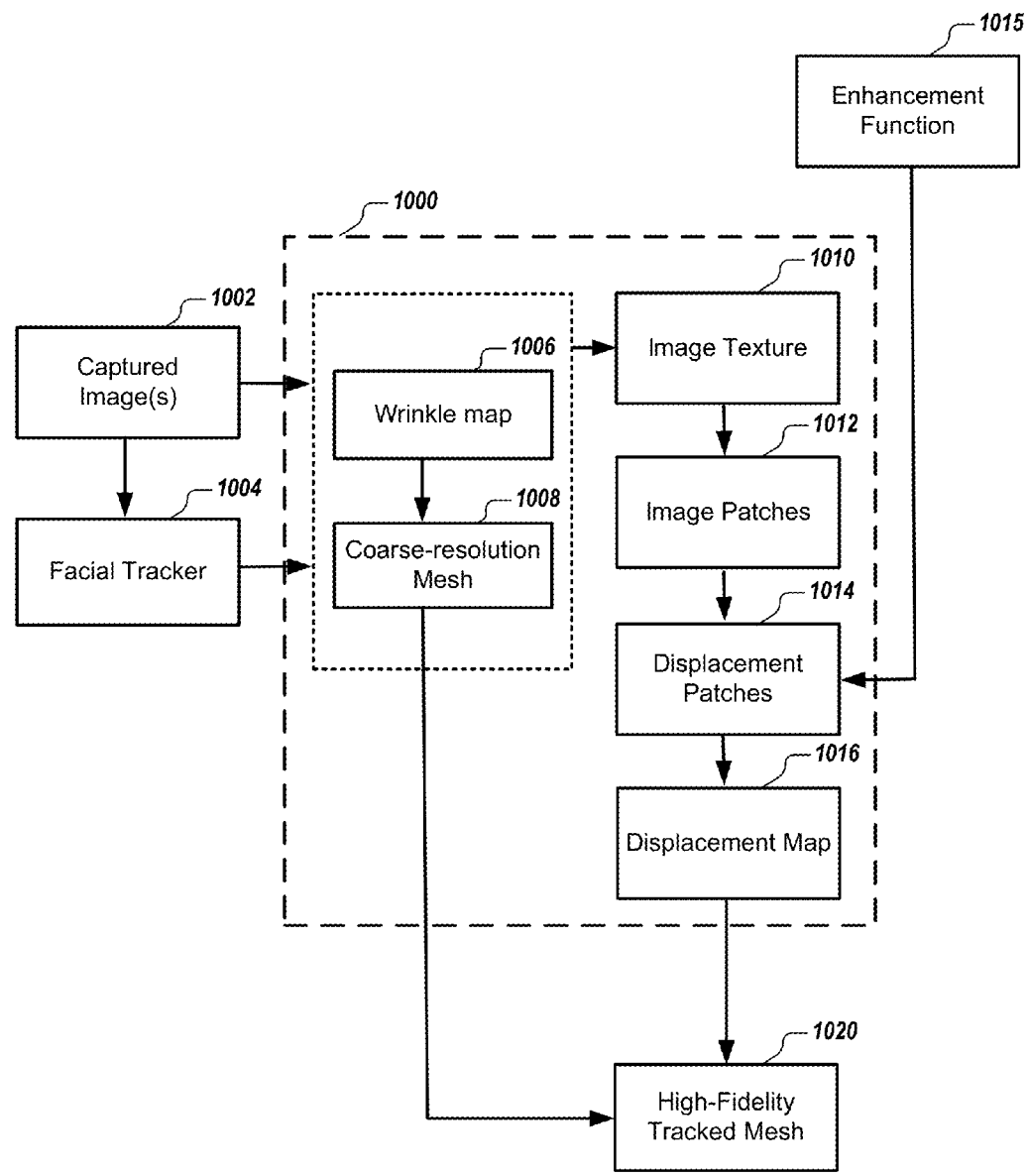
FIG. 10 is a simplified block diagram of an enhancement engine 1000 that can execute the method illustrated in FIG. 9 according to some embodiments of the disclosure.

After training engine 400 has trained enhancement function 416 on a sparse set of example expressions, enhancement engine 400 can use enhancement function 416 to enhance animations generated from images captured during a performance with wrinkle information or other finer-scale details as set forth in FIG. 1, block 120. Reference is now made to FIGS. 9A and 9B, which are flowcharts that illustrates some embodiments of a method 900A, 900B according to the present disclosure that can be used to add finer-scale details to facial performances of users, and FIG. 10, which is a block diagram of an enhancement engine 1000 that can execute method 900A, 900B according to some embodiments of the disclosure. In some embodiments, enhancement engine 1000 can reside on computer system 202 and can be representative of enhancement engine 224. The process illustrated in FIGS. 9A and 9B is not limited to subjects for which data was used in training stage 110. Instead, the process illustrated in FIGS. 9A and 9B can be used to enhance CG animations for any subject.

In methods 900A and 900B, images captured from a facial performance (FIGS. 9A and 9B, blocks 910) are tracked by a facial tracker to a coarse-resolution facial mesh (FIGS. 9A and 9B, blocks 920) to mimic the performance in a CG animation. As described above, the coarse-resolution mesh can produce realistic representations of the captured facial expressions of the subject, but cannot accurately capture finer-scale details, such as wrinkles, that can vary greatly from person-to-person. Embodiments of the disclosure can perform a brief user-initialization step to identify where the desired finer-scale details are missing from the coarse-resolution mesh (FIG. 9A, block 930). After the user-initialization step, the missing finer-scale details can be reconstructed (FIG. 9B, block 940) and then add the reconstructed finer-scale details to the coarse-resolution mesh to create a high-fidelity mesh (FIG. 9B, block 950). Once created and if desired, the high-fidelity mesh can be rendered to generate an animation that can be displayed (FIG. 9B, block 960).

In blocks 910, images 1002 can be captured from a motion capture system. In some embodiments, images are captured from a system, such as animation system 200 shown in FIG. 2, but other motion capture systems can be used. Additionally, while some embodiments of the disclosure images can be captured from a multi-camera image capture system, embodiments of the disclosure can also be used to enhance animations generated from images captured during a performance by a single camera. In blocks 920, a coarse-resolution mesh 1008 can be fit to the captured images by a global facial expression tracker 1004. A variety of different facial tracking tools, such as for example image fitting tools that are based on blendshapes, can be used as facial expression tracker 1004. As an example, some embodiments of the disclosure use a global face tracking tool as described in Cao et al., "Displaced Dynamic Expression Regression for Real-time Facial Tracking and Animation", ACM Trans. Graphics (Proc. SIGGRAPH) [2014], which uses an underlying face model with parameters for identity, expression and rigid transformation can be used as the real-time face tracker. In other instances, other types of image fitting tools can be employed.

In block 930, a user-initialization step is performed to identify locations in the coarse-resolution mesh that are missing the desired finer-scale details. This user-initialization step only needs to be performed once per user. In block 930, the user (i.e., the subject) can perform a small set of extreme expressions during a several second user-specific training period. In some embodiments this can be done at the beginning of the performance capture session for the user. Image textures for the training expressions can be generated (FIG. 9A, block 931) in the same manner described above with respect to FIG. 3 and a wrinkle map 1006 can be generated (FIG. 9A, block 932) from N frames, where N is a user controlled parameter, using the same techniques described above with respect to FIG. 3. Since wrinkle map 1006 will determine the possible locations wrinkles may appear in subsequent processing steps, it is beneficial if the N frames contain as many facial wrinkles of the user as possible. In embodiments where user-initialization block 930 is done immediately preceding a performance to be captured and reconstructed in method 900B, the N frames can be at the beginning of the performance. In other instances, the N frames can be selected from images of the subject captured from a prior performance.

After user-initialization step is performed and the user-specific wrinkle map 1006 is generated, the wrinkle map 1006 can be referenced by enhancement engine 1000 to predict finer-scale details missing from the coarse resolution mesh (FIG. 9B, block 940) for frames subsequent to the initialization period. In this process, enhancement engine 1000 generates image textures for each frame (FIG. 9B, block 941) in the same manner described above with respect to FIG. 3 and then using the wrinkle map determines where to retrieve wrinkle patches $\{t_i\}$ (pairs of image texture 1010 and image patches 1012) to estimate the local shape (FIG. 9B, block 942) for each frame. The displacement patches 1014 $\{d_i\}$ can be estimated using the trained enhancement function 1015 (e.g., enhancement function 416 trained according to the process set forth in FIG. 3) as $d_i=\Phi(t_i)$ (FIG. 9B, block 943). In practice, enhancement function 1015 does not regress on the displacement directly but instead in the PCA space on the coefficients $c_i$ as $$c_i = \bar{c} + \Sigma_{k=1}^{K} R^k(t_i) \quad (6)$$

where the $\bar{c}$ is the average coefficients of all training samples.

This equation can be evaluated very efficiently and in parallel since the proposed one-level regressors do not exhibit any interdependencies at runtime anymore. From the regressed coefficients, the local displacements can be reconstructed via the PCA basis (FIG. 9B, block 944).

Figure 11:
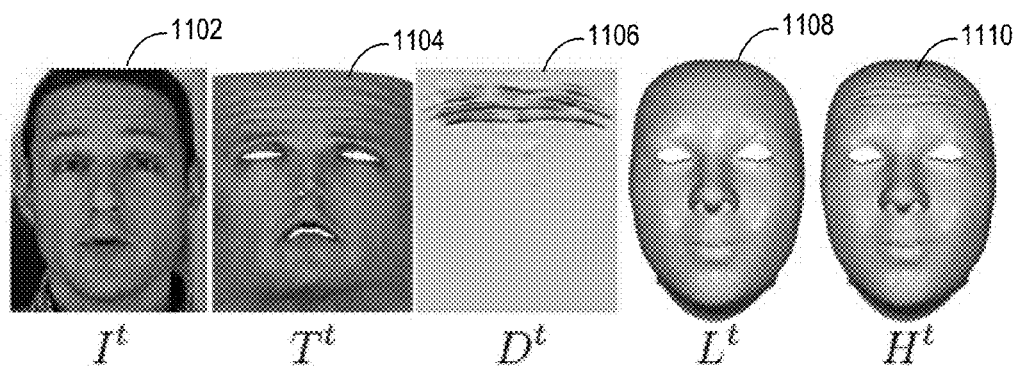
FIG. 11 illustrates an example image and example high-fidelity mesh generated from the example image according to some embodiments of the disclosure.

These reconstructed displacement patches 1014 $\{d_i\}$ are then merged to generate the displacement map 1016 ($D^r$) (FIG. 9B, block 945) an example of which is shown in FIG. 11 as image 1106 which was predicted from a texture map 1104 ($T^r$) that was, in turn, generated from an image 1102 ($I^r$) of the subject. Pixels in ($D^r$) which belong to multiple patches average the predicted displacements, and pixels which are not covered by any patch are smoothly filled in by solving a Poisson system on the texture domain. Since the patch coverage is fixed once the wrinkle map has been computed, enhancement engine 1000 can pre-factorize the Poisson matrix to achieve real-time performance.

The previous blocks provide both coarse-resolution (e.g. overall expression) and finer-scale details (e.g. wrinkles). If desired, high-frequency details (e.g., pores) can also be added. For example, in some embodiments, a simplified version of mesoscopic augmentation can be used to add desired high-frequency details.

Next, the coarse-resolution mesh 1008 ($\tilde{L}^r$), an example of which is shown in FIG. 11 as mesh 1108, can be augmented with the finer-scale details (e.g. wrinkles) identified in displacement map 1016 ($D^r$) (see also FIG. 11, 1106) to produce the high-fidelity mesh 1020 ($H^r$) (FIG. 9B, block 950) an example of which is shown in FIG. 11 as mesh 1110. Processing for this step is straightforward, since modern graphics hardware natively supports displacement mapping. Finally, if desired, the high-fidelity mesh can be rendered to produce an animated CG character that can be displayed on a screen or similar display device (FIG. 9B, block 960). In other instances, the high-fidelity mesh can be used for other purposes and is not rendered.

The embodiments discussed above can track facial performances including finer-scale details such as wrinkles in real-time such that blocks 910 through 960 in FIG. 9B are performed, on a frame-by-frame basis, substantially simultaneously (e.g., delays between blocks are due to de minimis amount of time it takes an appropriate processor to perform the various calculations and graphics processing steps for a given frame). Being able to faithfully capture and reproduce these finer-scale details adds greatly to the visual quality and perceived intensity of facial expressions animated in real-time. In embodiments where real-time operation is not necessary, the performance capture of block 910 can be performed prior to the blocks 920 through 960. In still other embodiments, block 920 can track a coarse mesh to the performance of block 910 in real-time while processing of the coarse-resolution mesh of blocks 930-960 can be performed later.

Figure 12:
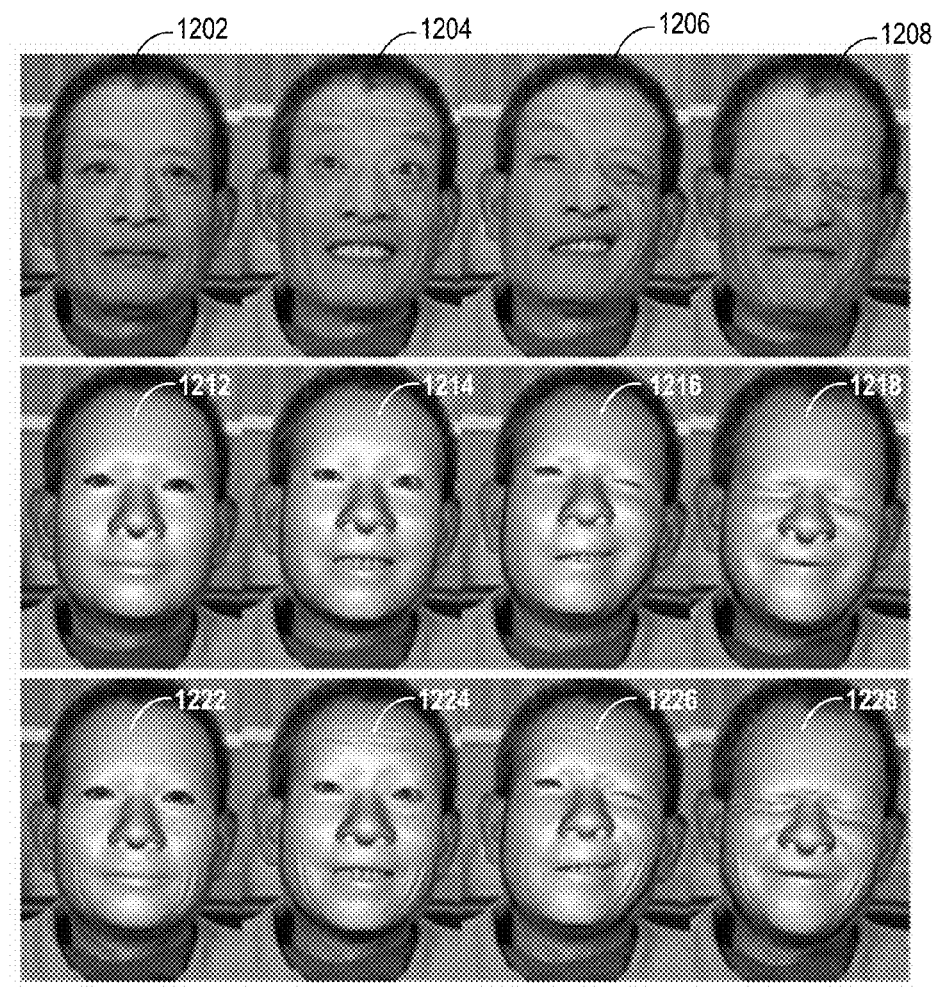
FIG. 12 illustrates several example images and respective high-fidelity meshes generated from the example images according to some embodiments of the disclosure.

Being able to faithfully capture and reproduce these details adds greatly to the visual quality and perceived intensity of facial expressions. As an example, FIG. 12 illustrates examples of facial expressions having finer-scale details that can be transferred to a mesh according to embodiments of the disclosure. In FIG. 12, images 1202, 1204, 1206 and 1208 depict different expressions of a subject, each of which includes some finer-scale details in the form of wrinkles. Also, shown in FIG. 12 are coarse-resolution meshes 1212, 1214, 1216 and 1218 that correspond to each of the images in the figure directly above the meshes and high-fidelity meshes 1222, 1224, 1226 and 1228 that have had finer-scale details added to the meshes in accordance with embodiments of the disclosure. As shown in FIG. 12, the coarse-resolution meshes generally do not include wrinkle details for any of the expressions while the high-fidelity meshes include wrinkle-details for each of the expressions.

Embodiments of the disclosure discussed herein can be generic and work on novel users without requiring any offline training or manual preprocessing steps other than performing several expressions during a several second period (e.g., less than five seconds) as part of constructing a wrinkle map for the user.

Figure 13:
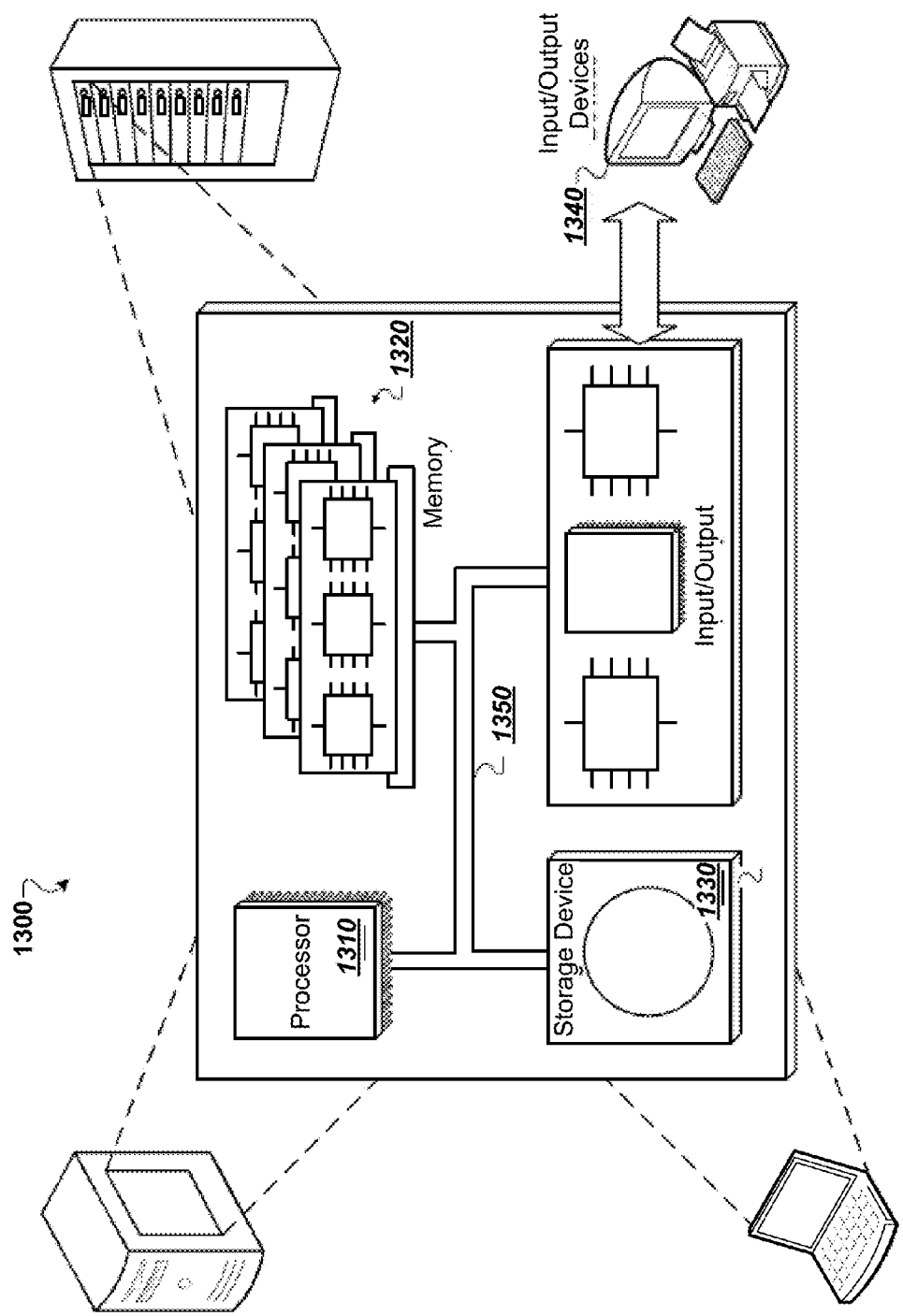
FIG. 13 is a simplified schematic diagram of an example of a computer system on which embodiments of the invention can be implemented.

Referring now to FIG. 13, a schematic diagram is shown of an example of a computer system 1300. The computer system 1300 is exemplary only and one having skill in the art will recognize that variations and modifications are possible. The system 1300 can be used for the operations described in association with the processes 200-500 of FIGS. 2-5, as well as any of the components shown in FIG. 1. For example, the components shown in FIG. 13 may be used at part of the computer 110 or the input sensor 120.

The system 1300 includes a processor 1310, a memory 1320, a storage device 1330, and an input/output device 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to perform the steps of processes according to the present invention.

The memory 1320 stores information within the system 1300 and may be associated with various characteristics and implementations. For example, the memory 1320 may include various types of computer-readable medium such as volatile memory, a non-volatile memory and other types of memory technology, individually or in combination.

The storage device 1330 is capable of providing mass storage for the system 1300. In one implementation, the storage device 1330 is a computer-readable medium. In various different implementations, the storage device 1330 may be a floppy disk device, a hard disk device, an optical disk device, or a tape device.

The input/output device 1340 provides input/output operations for the system 1300. In one implementation, the input/output device 1340 includes a keyboard, pointing device, touchscreen display, and/or the like. In another implementation, the input/output device 1340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system 1600 can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

The foregoing description, for purposes of explanation, used specific nomenclature to provide a thorough understanding of the described embodiments. However, it will be apparent to one skilled in the art that the specific details are not required in order to practice the described embodiments. For example, while various embodiments of the disclosure were described with respect to facial performance capture, embodiments of the disclosure can be used for other applications, such as garment capture or full body capture. Also, while description of embodiments above referred adding "finer-scale" details to a "coarse-resolution" model, embodiments of the disclosure are not limited in this manner. As discussed above, "coarse-resolution" or "coarse-scale" features are features that are common among the samples (e.g., images, geometric models and/or other suitable samples) that are used to generate the global model of the subject. "Finer-scale" details, on the other hand, are features that are not common among the samples or where variation between samples is too complex to be subsumed by the statistical global model. In embodiments where wrinkles are added to a global model of a face that lacks such details, the relative size of the features (wrinkles) as compared to the nose, eyes and mouth can accurately be described by the terms "coarse-scale" and "finer-scale". This is coincidental. Embodiments of the disclosure can be applied to other scales, and/or to different scales. In other embodiments, the general features common to the images used to create the global model may be small relative to details that are missing from the model and can be added according to the techniques described herein. When applied to other scales, the regression described can be focused on the scale of the features to be added and thus may not necessarily be applied to a medium-resolution feature that lies between high-resolution and low-resolution scaled features.

Thus, the foregoing descriptions of the specific embodiments described herein are presented for purposes of illustration and description. They are not target to be exhaustive or to limit the embodiments to the precise forms disclosed. Also, while different embodiments of the invention were disclosed above, the specific details of particular embodiments may be combined in any suitable manner without departing from the spirit and scope of embodiments of the invention. Further, it will be apparent to one of ordinary skill in the art that many modifications and variations are possible in view of the above teachings.

What is claimed is:

1. A method for transferring a facial expression from a subject to a computer-generated character, the method comprising:
    receiving an input image capturing a facial expression of a subject;
    matching a first facial model to the facial expression in the input image;
    generating a displacement map representing finer-scale details not present in the first facial model using a regression function, wherein the regression function estimates the finer-scale details with one or more shapes using shading information determined from the input image, and wherein the one or more shapes correspond to the facial expression in the input image;
    combining the displacement map with the first facial model to create a second facial model that includes the finer-scale details; and
    rendering the second facial model to create a computer-generated image of the facial expression of the subject that includes the finer-scale details, wherein the computer-generated image is used for a computer-generated animation.

2. The method set forth in claim 1 wherein the finer-scale details comprise one or more wrinkles.

3. The method set forth in claim 2 wherein prior to generating the displacement map, the regression function is trained from data representing a plurality of expressions from a plurality of different subjects.

4. The method set forth in claim 3 wherein training the regression function comprises:
    for each expression in the plurality of expressions, generating an image texture of the expression and an expression displacement map that encodes wrinkle information for the expression; extracting a plurality of wrinkle patches at a plurality of different locations, each wrinkle patch including an image patch and a corresponding displacement patch; and training a regression function to predict displacement patches from the image patches.

5. The method set forth in claim 4 wherein:
    the plurality of locations are determined from a wrinkle map that encodes the per-pixel likelihood of a wrinkle forming at locations in the wrinkle map; and
    the wrinkle map is created from wrinkle information from a plurality of expressions in the plurality of expressions.

6. The method set forth in claim 4 wherein wrinkle patches are selected such that they are centered at wrinkles and oriented consistently.

7. The method set forth in claim 6 wherein the wrinkle patches are rectangular patches having a definable width and a definable length.

8. The method set forth in claim 7 wherein the displacement map is created by referencing a wrinkle map to retrieve a plurality of wrinkle patches, estimating locations of displacement patches using the regression function, reconstructing local displacements and merging the reconstructed local displacement patches.

9. The method set forth in claim 2 further comprising constructing a wrinkle map during a user-initialization step that determines possible locations wrinkles may appear in the first facial model from one or more images of the subject.

10. The method set forth in claim 1 wherein:
    a sequence of input images of a facial performance of the subject captured with a camera is received, the sequence of images comprising a plurality of sequential frames each depicting the facial performance at a different time;
    on a frame-by-frame basis: the first facial model is matched, to a frame in the sequence of input images; a displacement map for the frame is generated that represents finer-scale details not present in the first facial model at the frame; and the displacement map for the frame is combined with the first facial model matched to the frame to create a second facial model that includes the finer-scale details.

11. The method set forth in claim 10 further comprising rendering the second facial model to create the computer-generated animation of the subject that includes the finer-scale details and mimics the facial performance.

12. The method set forth in claim 11 wherein rendering the second facial model occurs in real-time with capturing the sequence of input images of the facial performance.

13. The method set forth in claim 11 wherein the sequence of input images is captured with a single monocular camera.

14. A system comprising:
    one or more processors; and
    a computer-readable memory coupled to the one or more processors, the computer readable memory storing instructions that cause the one or more processors to:
        receive an input image capturing a facial expression of a subject;
        match a first facial model to the facial expression in the input image;
        generate a displacement map representing finer-scale details not present in the first facial model using a regression function, wherein the regression function estimates the finer-scale details with one or more shapes using shading information determined from the input image, and wherein the one or more shapes correspond to the facial expression in the input image;

combine the displacement map with the first facial model to create a second facial model that includes the finer-scale details; and render the second facial model to create a computer-generated image of the facial expression of the subject that includes the finer-scale details, wherein the computer-generated image is used for a computer-generated animation.

15. The system set forth in claim 14 wherein the first facial model comprises a numerical mesh generated from blendshapes and the finer-scale details comprise one or more wrinkles.

16. A non-transitory computer-readable medium storing a plurality of instructions executable by one or more processors, the plurality of instructions comprising:

instructions that receive an input image capturing a facial expression of a subject;

instructions that match a first facial model to the facial expression in the input image;

instructions that generate a displacement map representing finer-scale details not present in the first facial model using a regression function, wherein the regression function estimates the finer-scale details with one or more shapes using shading information determined from the input image, and wherein the one or more shapes correspond to the facial expression in the input image;

instructions that combine the displacement map with the first facial model to create a second facial model that includes the finer-scale details; and instructions that render the second facial model to create a computer-generated image of the facial expression of the subject that includes the finer-scale details, wherein the computer-generated image is used for a computer-generated animation.

17. A method of transferring captured information from a subject to a computer-generated version of the subject, the method comprising:

receiving an input image capturing a facial expression of a subject;

matching a first model comprising a plurality of first features to the facial expression in the input image, the first model being a statistical global model created from a plurality of samples each of which includes the plurality of first features;

generating a displacement map representing one or more second features not present in the first model using a regression function that estimates the one or more second features with one or more shapes using shading information determined from the input image, wherein the one or more shapes correspond to the facial expression in the input image, and wherein the one or more second features are one or more features present in one or more of the samples but not all the samples or where variation of the one or more second features between the plurality of samples is too complex to be subsumed by the first model;

combining the displacement map with the first model to create a second model; and rendering the second model to create a computer-generated image of the facial expression of the subject, wherein the computer-generated image is used for a computer-generated animation.

18. The method set forth in claim 17 wherein the subject is a human being, the first model is a facial model of a human being, the plurality of first features includes a nose, two eyes and a mouth, and the one or more second features include wrinkles.

* * * * *